Patented Oct. 19, 1937

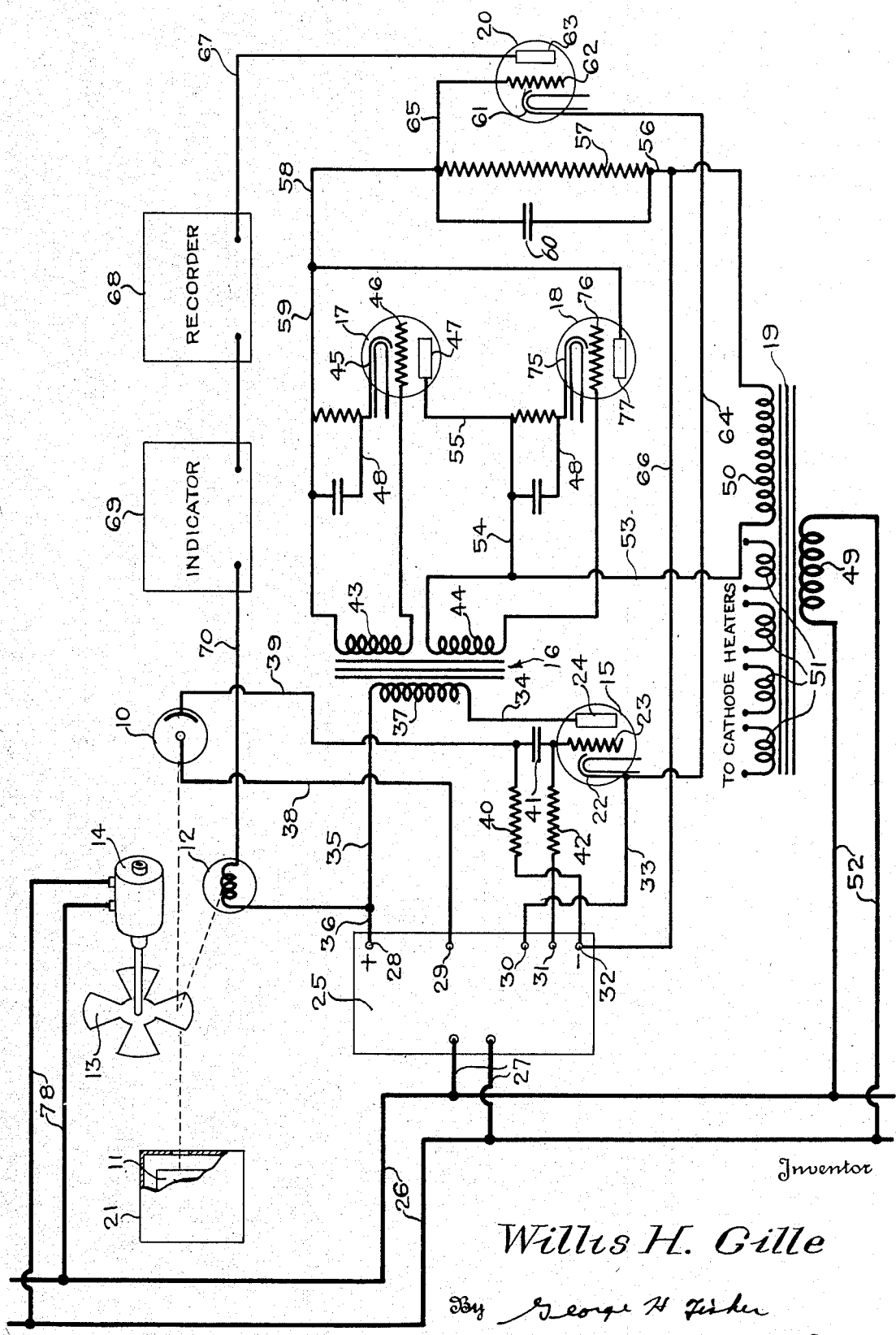

2,096,323

UNITED STATES PATENT OFFICE 2,096,323

TEMPERATURE MEASURING APPARATUS

Willis H. Gille, St. Paul, Minn., assignor to Minneapolis-Honeywell Regulator Company, Minneapolis, Minn., a corporation of Delaware Application October 31, 1935, Serial No. 47,608

12 Claims. (Cl. 250—41.5)

My invention relates to photo-metric temperature measuring apparatus of the broad type wherein the light given off from a hot body is used as an indication of the temperature thereof.

Devices of this kind have been devised wherein one or more photo-electric cells are subjected to the light from the hot body and to the light from a separate source, usually an electric lamp. Some of these devices employ a principle of operation which depends upon a certain balance being maintained in the light furnished by the two sources and in which, upon such a balance being destroyed by reason of the temperature of the hot body changing, means are brought into operation which changes the flow of current to the electric lamp, thus tending to restore the balance in the light furnished by the two sources. Suitable indicating means are provided in these cases for indicating the change in flow of current to the lamp and thus serve as a means for indicating the change in temperature of the hot body. Such temperature measuring devices are remarkably free from voltage variations and give a fairly accurate reading of the temperature of the hot body. All of the devices of this type, however, have had defects which render their use less desirable. In one type of such devices, two photo-electric cells are employed, one of which is illuminated by the hot body and the other of which is illuminated by the lamp. The difficulty with such a device is that the use of two photo-electric cells renders the apparatus accurate only when the response of the two photo-electric cells remains unchanged. There is no assurance, however, that such a condition can be maintained.

In another type of such devices, the difficulty of the previous type is avoided by the use of only one photo-electric cell and means to alternately subject said photo-electric cell to light from the hot body and light from the lamp. While such a device avoids the objection to the one employing two photo-electric cells, it is not entirely satisfactory in that the means employed to control the lamp in response to the variation in balance between the two light sources are not entirely satisfactory. In some cases such means involve the use of a large number of moving mechanical parts which introduce the possibility of error arising from wear and which tend to decrease the rapidity with which the device responds to a changed condition.

An object of the present invention is to provide a temperature measuring device of the type described which necessitates the use of only one photo-electric cell and in which the use of any mechanical elements in the control circuit is avoided.

A further object of my invention is to provide a new and novel means for varying the current flow through a circuit in accordance with the variation in phase and magnitude of the pulsations of a pulsating current flowing in another circuit.

Other objects of my invention will be apparent from the consideration of the accompanying specification, claims and drawing.

Referring to the drawing, my apparatus generally comprises a photo-electric cell 10 which is alternately subjected to light from a hot body 11 whose temperature is to be measured, and from an electric lamp 12, through the action of a rotated segmented disc 13 driven by a synchronous motor 14. The pulsating current flowing through photo-electric cell 10 is amplified by means of a thermionic amplifier 15 and converted into alternating current through a transformer 16. This alternating current is applied to the grids of two thermionic amplifiers 17 and 18 which are oppositely connected in an output circuit energized by the secondary of a transformer 19. Since the potential applied to said tubes is an alternating one, and since the tubes are oppositely connected in said circuit, current will flow through one of said tubes in one-half cycle and through the other in the other half cycle. The speed at which the synchronous motor is operated is chosen so that the frequency of the pulsating current flowing through photo-electric cell 10 will be twice as much in pulsations per second as the frequency of the alternating current supplied by transformer 19. In other words, there will be just as many pulsations per second as there are half cycles per second in the output circuit of tubes 17 and 18. Moreover, the synchronous motor will be operated so that the pulsating current is in phase with the alternating current supplied by transformer 19. Thus, the current flowing in the output circuit of tubes 17 and 18 will be an alternating current, the positive peaks of which are controlled by the intensity of the light supplied from one of the two sources of light and the negative peaks of which will be controlled by the light supplied from the other source of light. The difference between the negative and positive portions of the alternating current, if any, is impressed upon the input circuit of a thermionic amplifier tube 20 so as to vary the current flow through the output circuit of said tube depending upon whether said difference is positive or negative. In the plate circuit of said tube 20 are indicating and recording means and a lamp 12. The phase relation of the current flowing through the various portions of my apparatus is so controlled that in the event that the temperature of the hot body increases the flow of current in the output circuit of tube 20 also increases with a resultant increase in the flow of current through the indicating and recording means and through lamp 12, thus tending to re-establish a balance between the light supplied from lamp 12 and from hot body 11.

Referring more particularly to the details of my apparatus, I have shown hot body 11 as located in a furnace 21, which may be of any suitable type for creating high temperatures. The segmented disc 13 comprises four segments spaced apart to provide gaps therebetween corresponding in width to the segments. As will be more or less obvious from the drawing, when the disc is in the position shown therein the light from lamp 12 will be reflected onto the photo-electric cell 10. When the disc is moved 45°, however, the photo-electric cell will be subjected to the light from the hot body 11.

The synchronous motor 14 driving said segmented disc 13 is of any suitable type wherein it is possible to control the half cycle on which the motor will start. The motor is connected through conductors 78 with line wires 26, which are connected to a suitable source of alternating current.

The amplifier tubes 15 and 20 are supplied with direct current through a conventional power supply 25 which may be of any suitable form for converting the alternating current of the power supply into direct current. Said power supply is connected to the line wires 26 through conductors 27. Said power supply is provided with various taps 28, 29, 30, 31 and 32, the potentials of which decrease in the order named.

The thermionic amplifier 15 is shown in the form of a conventional three-electrode vacuum tube in which the cathode is indirectly heated. Said tube 15 comprises a cathode 22, a grid 23 and a plate 24. The cathode 22 of tube 15 is connected through a conductor 33 with the tap 30 of the power supply unit, while the plate 24 is connected through conductors 34, 35 and 36 to the positive terminal 28 of said power supply, in series with the primary 37 of transformer 16. The plate circuit of tube 15 accordingly comprises cathode 22, conductor 33, the portion of the power supply unit between taps 30 and 28, conductors 36, 35, primary 37, conductor 34 and the plate 24.

One terminal of photo-electric cell 10 is connected through conductor 38 to tap 29 of the power supply. The other terminal of said cell is connected through conductor 39 with one terminal of a resistance element 40. The other terminal of said resistance element is connected to the negative terminal 32 of the power supply. Thus, the photo-electric cell has a voltage supply thereto corresponding to the voltage between tap 29 and terminal 32 and the output of said cell is supplied to the resistance 40, which acts as a coupling resistance between the photo-cell and tube 15. Grid 23 is connected to one terminal of said resistance through a condenser 41 which serves to prevent the passage of any direct current. A resistance 42 is connected at one end between said grid 23 and condenser 41 and at the other end to the tap 31 of the power supply unit. The connection afforded by said resistance serves to bias the grid negatively with respect to the cathode.

As previously stated, the primary 37 of transformer 16 is connected in the plate circuit of tube 22. This transformer in addition to primary 37 comprises two secondaries 43 and 44.

Amplifiers 17 and 18 are each shown in the form of a three-electrode vacuum tube of the indirectly heated cathode type. Tube 17 comprises a cathode 45, a grid 46 and a plate 47. The cathode 45 of tube 17 is connected to the plate 77 of tube 18, while the cathode 75 of tube 18 is connected to the plate 47 of tube 17. In each case these connections involve the use of a grid biasing unit 48 comprising the usual resistance and condenser parallel therewith. The opposite terminals of secondary 43 are connected to the grid and cathode of tube 17, while the opposite terminals of secondary 44 are connected to the grid and cathode of tube 18. In each case, such connection is made through the biasing unit 48.

The transformer 19 is employed to supply the plate potential for tubes 17 and 18 and heating current for all of the tubes employed. This transformer comprises a line voltage, a primary 49, a high voltage secondary 50, and a plurality of low voltage secondaries 51 which furnish current for heating the cathode heaters of the various vacuum tubes employed. The primary 49 of said transformer is connected through conductors 52 with line wires 26.

One terminal of the secondary 50 is connected through conductors 53 and 54 with a conductor 55, which connects the plate of tube 17 with the cathode of tube 18. The other terminal of said secondary is connected through a conductor 56, a resistance 57, and a conductor 58 with a conductor 59 which connects the cathode of tube 17 with a plate of tube 18. It will be seen that the two tubes are oppositely connected in a circuit energized by the secondary 50 and including a resistance 57. It will further be seen that upon one-half cycle of the alternating voltage supplied by the transformer 19, one of the tubes will conduct current due to one plate being more positive than the cathode and on the other half cycle the other tube will conduct current. Thus an alternating current will flow in the output circuit of these tubes, the current in one-half cycle being controlled by one of the tubes and the current in the other half cycle being controlled by the other one thereof. A condenser 60 is connected across the terminals of resistance 57 and is of sufficiently large capacity to by-pass the majority of the alternating component of the current flowing in said circuit. Thus, there will be a voltage drop across resistance 57 only when the positive and negative portions of the current differ in magnitude, resulting in a direct current component.

The amplifier 20 is similarly a conventional three-electrode vacuum tube comprising an indirectly heated cathode 61, a grid 62 and a plate 63. Cathode 61 is connected through a conductor 64 and conductor 33 with a tap 30 of the power supply. Grid 62 is connected through a conductor 65, resistance 57, conductor 56, conductor 66 with the negative terminal 32 of the power supply unit. Thus, when there is no voltage drop across resistance 57 the grid 62 is biased negatively by a voltage equivalent to the voltage drop between taps 30 and 32. In the event, however, of a voltage drop in either direction in the resistance 57, the grid bias will obviously be changed.

The plate 63 of tube 20 is connected through a conductor 67, a current recording device 68, a current indicating device 69, a conductor 70, lamp 12 and conductors 71 and 36 with the positive terminal 28 of the power supply unit. Since the cathode 61 is connected as previously explained to tap 30, the plate circuit of tube 19 will have a voltage corresponding to that between taps 28 and 30 impressed thereon. The plate circuit, moreover, includes lamp 12 and indicators 68 and 69 so that any change in flow of current due to plate circuit will cause a corresponding change in flow of current through these devices.

So long as the light from the hot body 11 and from the lamp 12 is of equal intensity, the current flowing through the photo-electric cell 10 will be substantially non-pulsating. Due to the blocking action of condenser 41, the grid bias of tube 15 will not be affected. Any current flowing through the plate circuit of said tube will be a direct non-pulsating current with the result that no voltage will be produced in secondaries 43 and 44.

In the event, however, that the temperature of the hot body 11 either rises or falls so that the light received therefrom by the photo-electric cell 10 becomes more or less than the light received from lamp 12, the current flowing through photo-electric cell 10 will become pulsating in character, due to the fact that the resistance thereof is less when subjected to one of said sources of light than when it is subjected to the other. This pulsation in the current will cause a pulsating voltage to be applied to grid 23 causing the plate current of tube 15 to be pulsating. The flow of this pulsating current through the primary 37 of transformer 16 produces an alternating voltage in secondaries 43 and 44, which alternating voltage is applied to the grids of tubes 17 and 18. As previously explained, the frequency of the pulsating current is so related to the frequency of the alternating current supplied by transformer 19 that for each pulsation there is a corresponding half cycle of alternating current. Further, as previously explained, on one of said half cycles one of the tubes 17 and 18 passes current and on the other one-half cycle the other tube passes current. When an alternating current is impressed upon the grids by the secondary 43 the result will be that on one-half cycle the two grids will be positive and on the other half cycle the two grids will be negative with respect to the respective cathodes. Thus, the current flow through the tube which occurs at the time that the grids are positive will be relatively large, while the current flow which occurs through the other tube while the grids are negative will be relatively small. The result will be that the current in the portion of the output circuit including the resistance 57 and the condenser 60 will be an alternating current, the positive and negative portions of which differ in magnitude. In other words, the current flowing through this circuit is one having an alternating component and a direct component, the polarity of which depends on whether the positive or negative portions of the alternating current are larger. The alternating component of this current passes for the most part through condenser 60 due to the relatively low impedance thereof to said alternating component, while the direct component thereof flows through resistance 57. The result will be that there will be a voltage drop across resistance 57 the polarity of which depends on whether the positive or negative halves of the current in the output circuits of tubes 17 and 18 are greater. Since resistance 57 is in the grid circuit of tube 20, any voltage drop across the same affects the bias of said tube, as previously explained. A change in this bias causes a corresponding change in the flow of plate current of said tube and due to the fact that the lamp 12 and the recorder 68 and indicator 69 are in said circuit such a change will cause a change in the flow of current through these devices. It will be readily seen that by properly timing the start of the synchronous motor 14 with respect to the phase of the alternating current of the power supply, it is possible to cause an increase in the temperature of body 11 with the resultant increase in the light supplied to the photo-electric cell 10 by said body to result in an increase in the flow of current through lamp 12. When this is the case, any unbalancing of the system caused by the temperature of the hot body changing will immediately affect the flow of current through lamp 12 in a direction tending to re-balance the system. This change in flow of current also serves as a means for indicating and recording the temperature of the hot body.

In the event of a change in the voltage of the power supply, the only direct effect thereof would be a change in the illumination of lamp 12. Thus, if the line voltage should decrease, the current through lamp 12 would decrease due to a decrease in the various voltages applied to the tubes. Upon such a decrease in current flow through lamp 12 taking place, however, the system is unbalanced and lamp 12 is supplied with more current in precisely the same manner as previously described. Such an increase in the current flow through lamp 12 tends to restore said current flow to the value it had before such voltage fluctuation took place. Thus, my temperature measuring device gives an accurate reading even though there be a large variation in the voltage of the power supply.

It will be seen that aside from the synchronous motor, my apparatus involves the use of no moving parts whatever. All of the action taking place from the time the circuit is unbalanced due to the photo-electric cell receiving more light from one of the two sources of light than from the other occurs through the medium of thermionic devices, the response of which, as is well known, is almost instantaneous. Thus, in the event of any change occurring in my apparatus due to a change in the hot body 11 or due to a change in the line voltage, the apparatus will instantaneously respond to such change and will assume a new balanced condition.

While I have shown a specific embodiment of my device, it will be understood that this is for purposes of illustration only, and that my invention is limited only by the scope of the appended claims.

I claim as my invention:

1. In apparatus for use with a source of light, an electric lamp constituting a second source of light, a light sensitive cell, means for alternately subjecting said photo-electric cell to light from said source and from said lamp, an amplifier comprising a space discharge device, an output circuit for said space discharge device including said electric lamp and current translating means, means for energizing said circuit, an input circuit for said space discharge device, and means associated with said input circuit, operative upon said light sensitive cell receiving more light from one of said sources of light than from the other to vary the current flow through said output circuit including said lamp and said translating means in a direction tending to equalize the light supplied by said two sources of light.

2. In apparatus for use with a source of light, an electric lamp constituting a second source of light, a light sensitive cell, means for alternately subjecting said photo-electric cell to light from said source and from said lamp, an amplifier comprising a space discharge device, an output circuit for said space discharge device including said electric lamp and current translating means, means for energizing said circuit, an input circuit for said space discharge device, means in said input circuit for impressing a normal voltage thereon, means associated with said light sensitive cell for generating an alternating voltage, the relative magnitude of the positive and negative portions of which varies in accordance with the relative amounts of light received from said two sources, and further means in said input circuit to vary the normal voltage on said circuit by an amount corresponding to the difference in value between the positive and negative portions of said alternating potential to vary the flow of current in said output circuit and through said lamp and translating means, said last named means varying the voltage impressed on the input circuit in such a direction as to cause the output current to vary in a manner tending to equalize the light supplied from said two sources.

3. In an apparatus for measuring the intensity of a source of light, an electric lamp constituting a second source of light, a light sensitive cell, means for alternately subjecting said photo-electric cell to light from said source and from said lamp, an amplifier comprising a space discharge device, an output circuit for said space discharge device including current measuring means and said electric lamp, means for energizing the same, an input circuit for said space discharge device, and means associated with said input circuit operative upon said light sensitive cell receiving more light from one of said sources of light than from the other to vary the current flow through said output circuit including said current measuring means and said lamp in a direction tending to equalize the light supplied by said two sources of light.

4. In measuring apparatus to be employed in connection with a plurality of conditions, the magnitude of one of which is to be measured, a thermionic amplifier, an output circuit for said amplifier including current measuring means and electrically operated means for varying the condition other than the one to be measured, means for energizing said circuit, an input circuit for said amplifier, means in said input circuit for impressing a normal voltage thereon, means for generating an alternating voltage, the positive and negative portions of which vary in relative magnitude with the relative magnitude of said two conditions, and means in said input circuit to vary the normal voltage on said circuit by an amount corresponding in polarity and magnitude to the difference in value between the positive and negative portions of said alternating voltage to vary the flow of current through said output circuit including said current measuring means and said condition varying means, said last named means varying the voltage impressed on the input circuit in such a direction as to cause the output current to vary in a manner tending to cause said condition varying means to equalize said two conditions.

5. In measuring apparatus to be employed in connection with a plurality of conditions, the magnitude of one of which is to be measured, a thermionic amplifier, an output circuit for said amplifier including current measuring means and electrically operated means for varying the condition other than the one to be measured, means for energizing said circuit, an input circuit for said amplifier, means in said input circuit for impressing a normal voltage thereon, means including a space discharge device for generating an alternating voltage, the positive and negative portions of which vary in relative magnitude with the relative magnitude of said two conditions, and means in said input circuit to vary the normal voltage on said circuit by an amount corresponding in polarity and magnitude to the difference in value between the positive and negative portions of said alternating voltage to vary the flow of current through said output circuit including said current measuring means and said condition varying means, said last named means varying the voltage impressed on the input circuit in such a direction as to cause the output current to vary in a manner tending to cause said condition varying means to equalize said two conditions.

6. In measuring apparatus to be employed in connection with a plurality of conditions, the magnitude of one of which is to be measured, a thermionic amplifier, an output circuit for said amplifier including current measuring means and electrically operated means for varying the condition other than the one to be measured, means for energizing said circuit, an input circuit for said amplifier, means in said input circuit for impressing a normal voltage thereon, means for generating an alternating voltage, the positive and negative portions of which vary in relative magnitude with the relative magnitude of said two conditions, said means comprising two oppositely connected space discharge valves, one of which controls the positive half of said alternating voltage and the other of which controls the negative half thereof, and means in said input circuit to vary the normal voltage on said circuit by an amount corresponding in polarity and magnitude to the difference in value between the positive and negative portions of said alternating voltage to vary the flow of current through said output circuit including said current measuring means and said condition varying means, said last named means varying the voltage impressed on the input circuit in such a direction as to cause the output current to vary in a manner tending to cause said condition varying means to equalize said two conditions.

7. In combination, an electrical circuit, a second circuit, means for inducing a flow of direct, substantially non-pulsating current therein, and physically stationary means operative upon the presence of a pulsating direct current in said first named circuit to cause said direct, substantially non-pulsating current to assume a new substantially constant value, the magnitude of which is dependent upon the magnitude and phase position of the alternating component of said pulsating current.

8. In combination, an electrical circuit, a second circuit, means for inducing a flow of direct, substantially non-pulsating current therein, and physically stationary means operative upon the presence of a pulsating direct current in said first named circuit to cause said direct, substantially non-pulsating current to assume a new substantially constant value, the magnitude of which is dependent upon the magnitude and phase position of the alternating component of said pulsating current, said means comprising a plurality of grid controlled space discharge valves, means for applying a voltage to the grids of said valves which varies in accordance with said pulsating current, said valves being connected oppositely in a common output circuit, and means in said circuit for alternately applying a potential to each valve of a polarity causing the same to pass current, said means alternately applying said potential with a frequency corresponding to the frequency of the pulsating current.

9. In combination, a first circuit, an amplifier comprising a space discharge device, an output circuit for said space discharge device, a source of direct voltage for energizing said output circuit, an input circuit for said space discharge device, means for impressing a normally substantially constant biasing voltage on said input circuit to maintain a normally substantially constant flow of direct current in said output circuit, and physically stationary means operative upon the presence of a pulsating direct current in said first circuit to cause said biasing voltage to assume a new substantially constant value, the magnitude of which is dependent upon the magnitude and phase position of the alternating component of said pulsating current.

10. In combination, a first circuit, an amplifier comprising a space discharge device, an output circuit for said space discharge device, a source of direct voltage for energizing said output circuit, an input circuit for said space discharge device, means for impressing a normally substantially biasing constant voltage on said input circuit to maintain a normally substantially constant flow of direct current in said output circuit, physically stationary means operative upon the presence of a pulsating direct current in said first circuit to cause said biasing voltage to assume a new substantially constant value, the magnitude of which is dependent upon the magnitude and phase position of the alternating component of said pulsating current, said means comprising a plurality of grid controlled space discharge valves, means for applying a voltage to the grids of said valves which varies in accordance with the alternating component of said pulsating current, said valves being connected oppositely in a common output circuit, and means in said common output circuit for alternately applying a potential to each valve of a polarity causing the same to pass current, said means alternately applying said potentials with a frequency corresponding to the frequency of the pulsating current, and physically stationary means for varying the biasing voltage applied to the input circuit of said amplifier space discharge device in accordance with the value of the direct current component of the current in said common output circuit.

11. In combination, a first circuit, an amplifier comprising a space discharge device, an output circuit for said space discharge device, a source of direct voltage for energizing said output circuit, an input circuit for said space discharge device, means for impressing a normally substantially constant biasing voltage on said input circuit to maintain a normally substantially constant flow of direct current in said output circuit, physically stationary means operative upon the presence of a pulsating direct current in said first circuit to cause said biasing voltage to assume a new substantially constant value, the magnitude of which is dependent upon the magnitude and phase position of the alternating component of said pulsating current, said means comprising a plurality of grid controlled space discharge valves, means for applying a voltage to the grids of said valves which varies in accordance with the alternating component of said pulsating current, said valves being connected oppositely in a common output circuit, means in said common output circuit for alternately applying a potential to each valve of a polarity causing the same to pass current, said means alternately applying said potentials with a frequency corresponding to the frequency of the pulsating current, and means consisting of a resistance and a by-pass condenser parallel therewith connected in both said common output circuit and said amplifier input circuit.

12. In combination, a first circuit, means for inducing in said circuit the flow of a direct current, a condition responsive device in said circuit, means for periodically and successively subjecting said condition responsive device to each of two conditions tending to affect the conductivity of said element so that upon said conditions having values such as to affect said device unequally, a pulsating direct current flows through said circuit, an amplifier comprising a space discharge device, an output circuit for said space discharge device, a source of direct voltage for energizing said output circuit, an input circuit for said space discharge device, means for impressing a normally substantially constant biasing voltage on said input circuit to maintain a normally substantially constant flow of direct current in said output circuit, and physically stationary means operative upon the presence of a pulsating direct current in said first circuit to cause said biasing voltage to assume a new substantially constant value, the magnitude of which is dependent upon the magnitude and phase position of the alternating component of said pulsating current.

WILLIS H. GILLE.